June 20, 1967 S. J. SMITH 3,325,996
HYDRAULIC BRAKE SAFETY DEVICE
Filed Sept. 8, 1965

STANLEY J. SMITH
INVENTOR.

BY Lyon & Lyon
ATTORNEYS

United States Patent Office 3,325,996
Patented June 20, 1967

3,325,996
HYDRAULIC BRAKE SAFETY DEVICE
Stanley J. Smith, 14025 Huston St.,
Sherman Oaks, Calif. 91403
Filed Sept. 8, 1965, Ser. No. 485,824
3 Claims. (Cl. 60—54.5)

The present invention relates generally to a safety device for use in hydraulic brake systems. More specifically, the present invention is related to an hydraulic line isolating device which prevents the total failure of a vehicle brake system arising from the loss of fluid pressure in only one portion thereof.

In the ordinary brake systems commonly in use in motor vehicles, both hydraulic and pneumatic, the line from the master cylinder connects through a distributor block to a plurality of independent brake lines, each of which extends to a brake cylinder at each wheel. The application of pressure from the master cylinder distributes hydraulic pressure equally in the individual lines so that an equal amount of braking pressure will be applied at each wheel. Thus, all of the independent lines are in communication with each other. If a leak occurs in one of these lines or in one of the brake cylinders, there will be a loss of pressure throughout the entire system and no braking pressure can be applied to any of the wheels. Most such failures occur as the result of brake cylinder failure occasioned by the extreme environmental conditions, such as alternate high and low temperatures, water, sand, mud, etc.

It is a general object of the present invention to provide a device which eliminates the possibility of total failure of a brake system occasioned by the loss of hydraulic pressure at only one point in the system.

More specifically, it is an object of this invention to provide an hydraulic brake line isolating device which prevents any loss of hydraulic pressure at or near a brake cylinder from interfering with the otherwise normal operation of the remaining operative portions of the system.

It is also an object of the present invention to provide a brake failure prevention device which will provide an alarm or other visual indication to the operator of the vehicle when there has been a loss of hydraulic pressure in some part of the system.

Further objects and advantages of the present invention will be readily understood from reading the attached description in conjunction with the accompanying drawings, in which.

Figure 1:
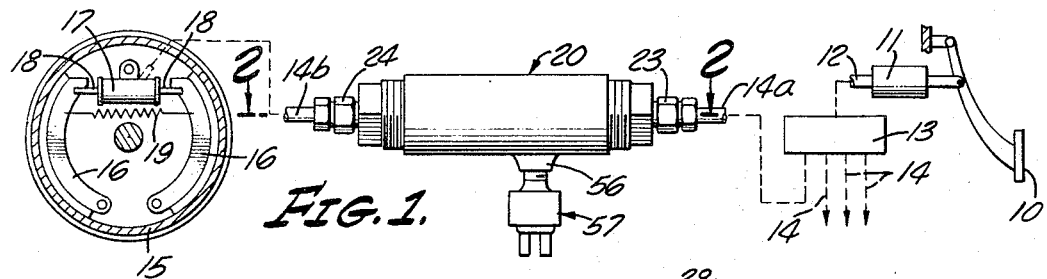
FIGURE 1 is a plan view of the device of this invention, diagrammatically showing its relationship to the usual brake system.
Figure 2:
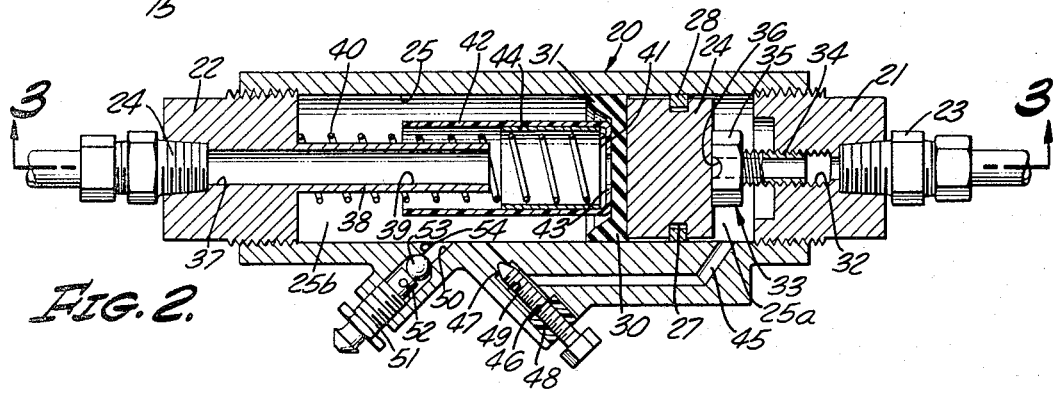
FIGURE 2 is an enlarged cross-sectional elevation taken along line 2—2 of FIGURE 1.

Referring now to FIGURE 1, an ordinary hydraulic brake system is shown including a brake pedal 10 operably connected to a master cylinder 11, from which the hydraulic line 12 extends to a distributor box 13. Distributor box 13 provides a plurality of outlets to which the individual hydraulic lines 14 are attached and extend to the brake cylinders. The brake itself includes a drum 15 and a pair or arcuate brake shoes 16 pivotally mounted therein having one end operably connected to the brake cylinder 17 to which the hydraulic line 14 is connected. Depression of the brake pedal 10 increases the hydraulic pressure in all of the lines 14 causing the piston arms 18 of the brake cylinder 17 to extend outwardly to force the brake shoes 16 against the inside of the drum 15. A return spring 19 biases the brake shoes away from the drum when pressure in the system is relaxed. Interposed between the brake cylinder 17 and the distribution box 13 is the cylindrical housing 20 embodying the features of the present invention.

The housing 20 comprises a substantially cylindrical bore having the plugs 21 and 22 threadably mounted in each end enclosing the interior of housing 20. Both the plugs 21 and 22 are provided with axial bores in which there is threadably mounted the connectors 23 and 24 respectively. The inlet side of the hydraulic line 14a is connected to connector 23 and the outlet line 14b is attached to connector 24. Midway in the axial bore 25 of housing 20, there is positioned a piston 26 having an annular groove 27 which retains therein the piston ring 28. Contiguous to the piston 26, there is a resilient sealing boot 30 in which the edges 31 are flared outwardly so as to form a seal along the inner walls of the axial bore 25.

In the plug 21, there is a threaded bore 32 which retains an adjustable piston stop 33. The piston stop 33 includes a hollow threaded stem 34 which communicates with the bore 32, and an enlarged abutting member 35 having one or more radial passages 36 which communicate with the hollow stem 34. In the other plug 22, there is an axial fluid passage 37. A cylindrical stem 38 is mounted on the inside of plug 22 so that its axial passage 39 communicates with the fluid passage 37 in plug 22. The stem 38 acts as a guide and retaining means for the coil spring 40 which is positioned coaxially with stem 38 in abutting relationship with the plug 22 and projecting inside the fluid chamber 25 until its opposite end 41 is adjacent said sealing boot 30. A cylindrical spring cup 42 is positioned coaxially over said spring 40, and the enclosed end 43 thereof interposes between the end 41 of spring 40 and the inner surface of the sealing boot 30. The spring cup 42 may be constructed of a transparent plastic material and is provided on the inside thereof with a colored index 44 extending only partially the length of cup 42.

A by-pass vein 45 extends from the inlet chamber 25a and communicates with the outlet chamber 25b. Intermediate these two chambers, separated by the safety piston 26, there is a tapered pin 46 which coacts with the inlet valve seat 47 to control the flow of fluid through vein 45. Tapered pin 46 is retained by the threaded bushing 48 so that it projects into the valve chamber 49 but prevents leakage past pin 46 to the outside. A second vein 50 communicates the outlet chamber 25b with a bleed valve 51 threadably supported in valve chamber 52. Bleed valve 51 coacts with the spherical valve piece 53 upon the valve seat 54.

Figure 3:
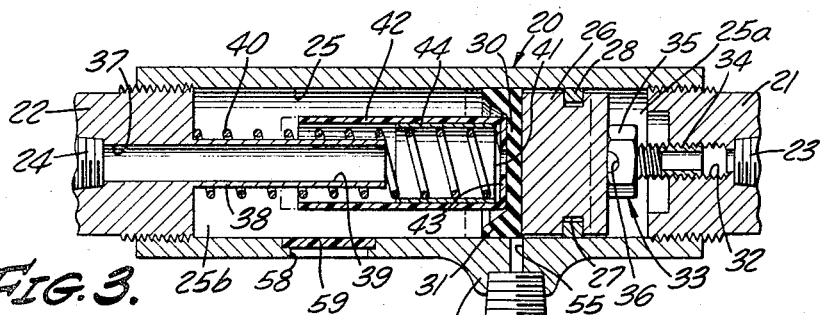
FIGURE 3 is a partial sectional plan view taken along line 3—3 of FIGURE 2.

Turning now to FIGURE 3, the plan view of the device shows a third vein 55 extending through the housing 20 at a point midway between the inlet chamber 25a and the outlet chamber 25b so that the vein 55 meets the safety piston 26 at a point intermediate the piston ring 28 and the sealing boot 30. The vein 55 extends into the boss 56 in which is threadedly mounted an hydraulic brake switch 57. This hydraulic brake switch 57 is of ordinary design of the type commonly used in hydraulic systems of current use wherein the increase in hydraulic pressure closes the switch contacts to complete an electrical circuit. The application of an hydraulic brake switch to the present device at this particular location will become apparent following a description of the operation of this device.

An aperture is formed in the wall of housing 20 in a portion adjacent the outlet chamber 25b. The aperture 58 is closed by a piece of transparent material 59 thereby forming a window so that visual inspection of the interior of chamber 25b may be made. The purpose of this window will likewise become apparent upon the description of the function of the present invention.

When this isolating device is initially placed in a brake system, it is necessary to place it in its operative conditon and ths requires that all the interior chambers 25 be filled with hydraulic fluid and that all air be eliminated therefrom. Hydraulic fluid is introduced to the system through the inlet line 14a whereupon it will pass through the passage 32 and fill the inlet chamber 25a. When this chamber is filled, the fluid will pass into the by-pass vein 45. The tapered pin 46 is withdrawn from the valve seat 47 allowing the fluid to pass into the chamber 25b so that it completely fills chamber 25b, enters the axial passage 39 of stem 38, whereupon it will flow through passage 37 and on out the outlet line 14b extending to the brake cylinder 17. When the brake cylinder 17 has been completely filled with fluid and the outer brake shoe 16 is pressed against the brake drum 15 because of pressure being applied by the foot brake 10, the wheel brake cylinder 17 is then bled of air through the bleed valve of brake cylinder 17. When all air in cylinder 17 is released, the bleed valve in cylinder 17 is closed. At this point, the brakes are actuated creating pressure in chamber 25b, forcing brake shoe 16 against drum 15 again and also forcing piston 26 against piston stop 35. It is at this point while pressure is being applied that the taper pin 46 is then tightened down, leaving the brake shoe 16 under pressure and stopping the flow of fluid from line 14b back through 46 to line 14a when pressure is released from foot brake 10. Thus creating a pressure in the cylinder 25b forcing the piston 26 against the piston stop 35. The bleed valve 51 is then loosened and any remaining air bubbles or excess fluid trapped in line 14b by the pressure is then released equalizing the fluid pressure in both chambers 25a and 25b. Bleed valve 51 is then tightened and the system is again ready for operation.

In the initial, no-pressure situation, the safety piston 26 is situated near or abutting the piston stop 35. The coil spring 40 retains the spring cup 42 firmly against the interior surface of boot 30 but the force of spring 40 is only sufficient to retain this condition and is not intended to act as a return spring to force the safety piston 26 against its stop 35. When the brakes are actuated, creating pressure in all of the hydraulic lines 14, pressure is increased in the inlet chamber 25a which will cause the safety piston 26 to move slightly into the outlet chamber 25b as indicated by the phantom lines 60 shown in FIGURE 3. This will create an equal pressure in chamber 25b which will be communicated down the passages 39 and 37 to the brake cylinder 17 the same as if the device was not present in the system at all. Thus, the introduction of this device to the system does not alter the pressure characteristics or function of the hydraulic system under normal conditions.

Should a failure occur in the brake cylinder 17 or the hydraulic line 14b extending thereto, pressure in chamber 25b will not reach the value obtained in chamber 25a, and thus the piston 26 will move axially a much greater distance than under normal conditions and in the event of a total loss of pressure in chamber 25b, the piston 26 will move until the spring cup 42 is jammed against the inner surface of the plug 22, or until the step 38, acting as a stop, comes in contact with the end 43 of the cup 42. Upon reaching this extended position, although an additional quantity of brake fluid is required for operation of the remainder of the system, there will still be pressure in chamber 25a and throughout the rest of the brake system. Thus, even though there has been a failure in one portion of the system, the remaining brakes are still operative. The increased quantity of hydraulic fluid required in the system will be noticeable by a low brake pedal position which will indicate to the vehicle operator that there has been a failure somewhere in the system.

Figure 4:
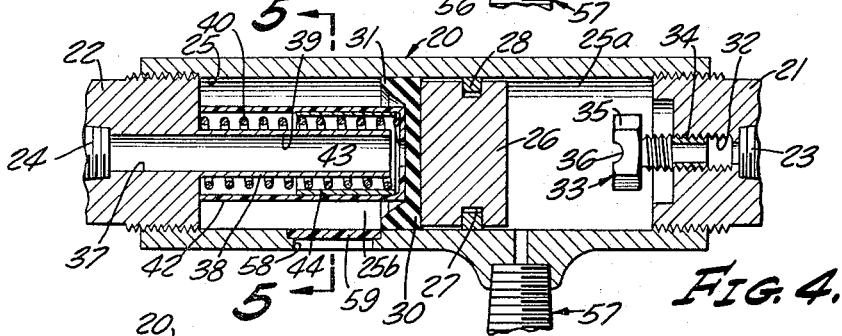
FIGURE 4 is a partial sectional plan view similar to FIGURE 3 showing the relationship of the parts following a brake failure.
Figure 5:
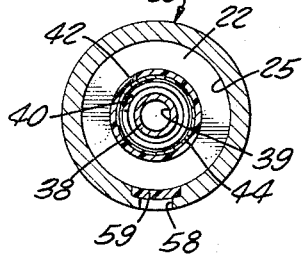
FIGURE 5 is a cross-sectional end view taken along line 5—5 of FIGURE 4.

As a further indication of the failure, the above-described hydraulic brake switch will not be actuated to provide a warning light or signal to the operator inside the vehicle. As shown in FIGURE 4, when the piston 26 travels down against the stop, the vein 55 is exposed to the interior of chamber 25a and the increased hydraulic pressure in that chamber will actuate the switch. During normal operation, the vein 55 communicates with the annular space between the sealing boot 30 and the piston ring 28 and there will be no increase of hydraulic pressure in vein 55 until the piston 26 moves to the left and the piston ring 28 passes the opening to vein 55. With the application of the hydraulic switch 57, any form of electrical alarm can be provided to warn the operator that a failure has occurred. In addition to this, when the vehicle has been stopped and the brake is to be repaired, it will be expedient if the location of the defective brake can be visually detected. The colored index 44 in the spring cup 42 will be adjacent the aperture 58 when a failure has occurred and a quick inspection of the aperture 58 will indicate the one where there has been a failure by the presence or absence therein of the colored index.

It will be noted in FIGURE 3 that during normal operation, when the brakes are applied, the colored index 44 does not travel sufficiently far to be seen through the aperture 58. The colored index 44 has an additional advantage other than the occasion of total failure of the brake wherein it acts only as secondary indicator in addition to the alarm provided by the hydraulic switch 57. The presence of a slow leak in the brake cylinder 17 can be detected by visual inspection for the presence of the colored index 44 and this can be noted before the travel of the piston 26 is sufficient to allow the passage of the ring 28 past the vein 55 to set off the alarm with the hydraulic switch 57. Additional fluid can then be added through vein 45 to keep brake levels up.

While a particular embodiment of the present invention has been shown and described, it will be obvious to persons skilled in the art that changes and modifications may be made without departing from this invention in its broader aspects and therefore, it is the object of the appended claims to cover all such changes and modifications as fall within the true scope and spirit of this invention.

I claim:

1. A brake safety device adapted to be inserted in the brake line between the brake cylinder and the master cylinder of an hydraulic brake system comprising a housing having a cylindrical axial bore, means closing each end of said bore, each of said closing means having a fluid passage therethrough, means connecting said fluid passages to said brake line; a free piston situated in said bore, said piston having a plurality of sealing means cooperating with said bore to form a fluid tight seal, said piston separating said bore into inlet and outlet chambers; means for filling both said chambers with hydraulic fluid, said means including a vein by-passing said piston and communicating said inlet chamber with said outlet chamber, means closing said vein when both said chambers are full, and means for bleeding entrapped air from said outlet chamber; stop means situated in each of said chambers to limit the travel of said piston, means cooperative with said stop means indicating the position of said piston in said bore, said indicating means including a spring situated in said outlet chamber between said piston and said closing means, a spring cup receiving one end of said spring, said spring biasing said spring cup against said piston and movable therewith, an index piece attached to said spring cup, and an aperture in the wall of said housing into said outlet chamber to permit visual inspection of the position of said index piece therein.

2. A brake safety device adapted to be inserted in the brake line between the brake cylinder and the master cylinder of an hydraulic brake system comprising a housing having a cylindrical axial bore, means closing each end of said bore, each of said closing means having a fluid passage therethrough, means connecting said fluid passages to said brake line; a free piston situated in said bore, said piston having a plurality of sealing means cooperating with said bore to form a fluid tight seal, said sealing means spaced axially apart on said piston leaving an annular space therebetween, said space being unaffected by increases in fluid pressure in said bore, said piston separating said bore into inlet and outlet chambers; means for filling both said chambers with hydraulic fluid, said means including a vein by-passing said piston and communicating said inlet chamber with said outlet chamber, means closing said vein when both said chambers are full, and means for bleeding entrapped air from said outlet chamber; stop means situated in each of said chambers to limit the travel of said piston, means cooperative with said stop means indicating the position of said piston in said bore, said indicating means including an hydraulic switch mounted upon said housing, a fluid passage in said housing communicating said switch with the said annular space formed by said piston sealing means, said passage entering said bore at a location determined by aforesaid stop means for the piston during normal operation wherein both chambers are full of fluid, and means electrically coupled to said switch responsive to an increase in hydraulic pressure in said fluid passage in response to a movement of said piston beyond the point where said passage communicates with the aforesaid annular space.

3. A brake safety device adapted to be inserted in the brake line between the brake cylinder and the master cylinder of an hydraulic brake system comprising a housing having a cylindrical axial bore, means closing each end of said bore, each of said closing means having a fluid passage therethrough, means connecting said fluid passages to said brake line; a free piston situated in said bore, said piston having a plurality of sealing means cooperating with said bore to form a fluid tight seal, said sealing means spaced axially apart on said piston leaving an annular space therebetween, said space being unaffected by increases in fluid pressure in said bore, said piston separating said bore into inlet and outlet chambers; means for filling both said chambers with hydraulic fluid, said means including a vein by-passing said piston and communicating said inlet chamber with said outlet chamber, means closing said vein when both said chambers are full, and means for bleeding entrapped air from said outlet chamber; stop means situated in each of said chambers to limit the travel of said piston, means cooperative with said stop means indicating the position of said piston in said bore, said indicating means including an hydraulic switch mounted upon said housing, a fluid passage in said housing communicating said switch with said annular space formed by said piston sealing means, said passage entering said bore at a location determined by aforesaid stop means for the piston during normal operation wherein both chambers are full of fluid, and means electrically coupled to said switch responsive to an increase in hydraulic pressure in said fluid passage in response to a movement of said piston beyond the point where said passage communicates with the aforesaid annular space; said indicating means also including a spring situated in said outlet chamber between said piston and said closing means, a spring cup receiving one end of said spring, said spring biasing said spring cup against said piston and movable therewith, an index piece attached to said spring cup, and an aperture in the wall of said housing into said outlet chamber to permit visual inspection of the position of said index piece therein.

References Cited

UNITED STATES PATENTS

| 1,557,330 | 10/1925 | Reynolds | 60—54.5 X |
| 2,077,646 | 4/1937 | Snyder | 60—54.5 X |
| 2,111,930 | 3/1938 | Hinckley | 60—54.5 X |
| 2,451,828 | 10/1948 | Herriott | 303—84 |
| 2,719,404 | 10/1955 | Hobson | 60—54.5 |
| 2,824,627 | 2/1958 | Winter | 188—151.11 |

FOREIGN PATENTS

| 188,622 | 1/1957 | Austria. |
| 973,807 | 9/1950 | France. |
| 858,639 | 12/1952 | Germany. |
| 877,401 | 9/1961 | Great Britain. |
| 476,944 | 1/1953 | Italy. |
| 511,604 | 1/1955 | Italy. |

MARTIN P. SCHWADRON, *Primary Examiner.*

ROBERT R. BUNEVICH, *Examiner.*